United States Patent [19]

McLaughlin

[11] 3,887,459
[45] June 3, 1975

[54] PROCESS FOR TREATING WATER

[75] Inventor: Minor E. McLaughlin, Newfane, Vt.

[73] Assignee: Economic Development Corporation, Newfane, Vt.

[22] Filed: Feb. 25, 1974

[21] Appl. No.: 445,230

Related U.S. Application Data

[62] Division of Ser. No. 230,424, Feb. 29, 1972, Pat. No. 3,823,767.

[52] U.S. Cl. ................... 210/8; 210/15; 210/18
[51] Int. Cl.$^2$ ............................................ C02C 1/02
[58] Field of Search ........................... 210/3–8, 15, 210/18, 195, 14, 49, 63, 196; 61/1 R

[56] References Cited
UNITED STATES PATENTS

| | | | |
|---|---|---|---|
| 2,394,413 | 2/1946 | Walker | 210/8 |
| 2,633,453 | 3/1953 | McAllister | 210/208 |
| 2,901,114 | 8/1959 | Smith et al. | 210/62 |
| 3,473,334 | 10/1969 | Dexter | 61/1 R |
| 3,546,111 | 12/1970 | Busch | 210/18 |

Primary Examiner—Thomas G. Wyse
Assistant Examiner—Benoit Castel
Attorney, Agent, or Firm—Samuel J. DuBoff; David J. Mugford; Perry Carvellas

[57] ABSTRACT

A process for treating a body of water to cool and to increase the dissolved oxygen content of the water which involves producing controlled translatory waves in the body of water. The process includes storing water in a reservoir at a selected height above the level of the body of water, periodically releasing specified quantities of water from the reservoir at a point below the level and in an upward direction toward the surface and into the body of water. The upward direction of the released water is accomplished by releasing the water against a deflector located near the base of the reservoir. The released water forms a translatory wave in the body of water and as it moves away from the reservoir, it breaks causing effective mixing of air and water, cooling the water and increasing the oxygen content of the water. The translatory wave produced is referred to as a plunger breaker type. In this type of wave, the waves curl over in breaking enclosing an air pocket which explodes during the breaking process. This action accomplishes excellent mixing of air and water and where solid particles are present, breaking and pulverizing of the particles.

The process may be used in conjunction with natural or artificial bodies of water and provisions are made with artificial bodies for removal of water at a point remote from the point of wave formation at a rate substantially equal to the average rate of addition of water from the reservoir. The invention pertains to cooling water effluent from power generation stations to prevent thermal pollution of natural bodies of water. The invention in another embodiment pertains to a more efficient method of aerating and treating sewage.

15 Claims, 4 Drawing Figures

PROCESS FOR TREATING WATER

This is a division, of Application Ser. No. 230,424, filed Feb. 29, 1972 now U.S. Pat. No. 3,823,767.

BACKGROUND OF THE INVENTION

The present invention relates to a process for treating water and more particularly, to a process for treating water to cool and increase the oxygen content thereof.

In the past, with rapid industrialization and the emphasis on efficient and economical production, too little attention has been devoted to protecting the environment. As a consequence, domestic and industrial waste has fouled streams and rivers while power plants have rendered waters unsuitable for marine life due to thermal pollution. The urgent current need is to reverse the neglect of years past, clean up waters which have been polluted and to develop more effective methods of waste treatment and disposal which take ecological factors into account. Not only has this need been generally recognized, but governmental bodies are working diligently towards the goal of a better environment by imposing stricter ecological standards on both the public and the industry.

Cooling water used in some industrial processes and in steam electric power generation stations is characterized by high temperatures which reduce the capacity of water to hold oxygen in solution. Thermal pollution, however, is significant also because it changes the environmental thermal balance of the stream and effects the life cycle of plant and animal life.

COOLING WATER

Several different techniques have been used to cool warm effluent water from electrical power generation stations and other industrial plants. One such technique involves the use of natural draft cooling towers. These have been used for many years in Europe and have now become standard practice for meeting watercooling requirements, for example, of power stations in Britain. These structures are best suited for very large cooling water demands and are commonly 265 feet in diameter and 340 feet in height. These towers are relatively inefficient, require large amounts of land and in the winter, at the upper levels, tend to freeze. The initial costs are very high. They are also objectionable in that they are relatively unsightly. Other techniques involve the use of mechanical force draft cooling towers. These have the additional disadvantage of requiring large amounts of electrical power to provide the force draft.

Another conventional procedure for cooling is the use of cooling ponds. These proved to be relatively slow and inefficient and to require a great deal of acreage.

TREATING SEWAGE

The principal sources of water pollution are primarily domestic sewage and industrial wastes.

All waste waters are eventually discharged into surface or ground-water courses, which constitute the natural drainage of an area. Most waste waters contain offensive and potentially dangerous substances, which can cause pollution and contamination of the receiving water bodies. In the past, the dilution afforded by the receiving water body was usually great enough to render these waste substances innocuous. Since the turn of the century, however, the dilution of many rivers has been inadequate to absorb the greater waste discharges caused by the increase in population and expansion of industry.

Municipal sewage effluent put into streams requires oxygen for its stabilization by bacteria. Oxygen is often utilized more rapidly than it is replaced by reaeration, resulting in the death of the normal aquatic life in the vicinity of the source of sewage. Further downstream, if the oxygen demands are satisfied, reaeration replenishes the oxygen supply.

Natural bodies of water such as rivers, lakes and oceans have a capacity to self-purify. The self-purification capacity is determined by the available dilution, the biophysical environment of the stream, and the strength and characteristics of the wastes.

The concentration of the dissolved oxygen depends not only on the relative dilutions, but also upon the rate of oxidation of the organic material and the rate of reaeration of the stream.

Non-polluted natural waters are usually saturated with dissolved oxygen. They may even be supersaturated due to the oxygen released by green water plants under the influence of sunlight. When an organic waste is discharged into a stream, the dissolved oxygen is utilized by the bacteria in their metabolic processes to oxidize the organic matter. The oxygen is replaced by reaeration through the water surface exposed to the atmosphere. This replenishment permits the bacteria to continue the oxidative process in an aerobic environment. In this state, reasonably clean appearance, freedom from odors, and normal animal and plant life are maintained.

An increase in the concentration of organic matter stimulates the growth of bacteria and increases the rates of oxidation and oxygen utilization. If the concentration of the organic pollutant is so great that the bacteria use oxygen more rapidly than it can be replaced, only anaerobic bacteria can survive and the stabilization of organic matter is accomplished in the absence of oxygen. Under these conditions, the water becomes unsightly and malodorous, and the normal flora and fauna are destroyed. Furthermore, anaerobic decomposition proceeds at a slower rate than aerobic. For maintenance of satisfactory conditions, minimal dissolved oxygen concentrations in receiving streams are of primary importance.

Organic industrial waste produces a similar pattern in the concentration of dissolved oxygen. Certain chemical wastes have high oxygen demands which may be exerted quickly, producing a sudden drop in the dissolved oxygen content. Other chemical wastes may be toxic and destroy the biological activity in the stream.

Devices and methods have been described at length in the prior art for water purification and the treatment of waste materials. Generally, these methods employ settling tanks and treatment facilities which occupy a considerable area and are quite expensive.

The present invention pertains to a new and improved method for treating water which involves a unique combination of steps. The invention as described hereinafter has many advantages over the prior art and represents an important advance in this area.

OBJECTS OF INVENTION

Accordingly, it is an object of this invention to provide a new and improved process for treating water.

It is an object of the present invention to provide an efficient method for producing waves of a type which effectively mix air and water to substantially increase the oxygen content of the water.

Another object of the invention is to provide a method for the creation of controlled translatory waves of the spilling breaker type which optimize the mixing of air and water.

A more specific object of this invention is to provide a method for treating water by causing periodic controlled waves therein to increase the level of oxygen in the water.

Another object of the invention is to provide an efficient economical means for mixing air with sewage to assist in the biological attack on the sewage.

Another object of this invention is to provide a unique method for treating sewage to eliminate the pollutants therefrom by more effectively aerating the sewage.

SUMMARY OF THE INVENTION

This invention comprises a process for treating water to cool it and to increase the oxygen content thereof.

The present invention contemplates the generation of translatory waves of the spilling breaker type and includes a pool or large body of water and a wave-producing portion or reservoir area. The translatory wave that is produced is referred to as the plunger breaker type. In this type of wave, the waves curl over in breaking, enclosing an air pocket which explodes during the breaking process. The action accomplishes excellent mixing of air and water in sewage treatment where solid particles are involved breaking and pulverizing of the particles.

In accordance with the method of the present invention a pump receives water from the pool area and discharges it into the wave-producing portion at an average rate substantially equal to the rate of water flow from the latter to the former, raising the water level in the wave-producing portion above the normal quiescent level of the water within the pool. Then, a gate in the bottom of the wave-producing portion is opened and, as the water within is lowered by the effect of gravity converting the potential energy to kinetic energy, a controlled quantity thereof is forceably expelled into the pool area at a distance below the normal quiescent level thereof. Substantially all of this expelled portion is deflected upwardly to create a translatory surface wave upon the body of water within the pool area. This method produces waves by utilizing the potential energy of the hydraulic head of the raised portion of water and a properly proportioned directional control, and utilizes a predetermined pumping rate related to the rate of water released to the pool area. The apparatus used in accordance with this method is comparatively simple, enjoys improved reliability and reproducibility, and reduced operating and maintenance costs.

The apparatus can be produced and constructed on a barge such that it can be moved from one location to another.

The desired movement of water can be obtained by directing substantially all of the discharged water toward the surface of the body of water through an upwardly sloping discharge path, or preferably it can be obtained by directing substantially all of the discharged water in a horizontal direction against a baffle or deflector removed from the discharge gate and formed to direct substantially all of the discharged water toward the surface of the body of water.

We turn now to a more detailed discussion of a preferred embodiment of this invention. In accordance with the method of the invention, a pool area having an upstream end and a downstream end is used. A pair of substantially vertical sidewalls extend longitudinally along either side of the pool floor. The wave-producing portion is formed adjacent the upstream end by rearward extensions of the sidewalls, a rear wall extending laterally between the sidewalls, and a substantially horizontal floor spaced above the downstream end of the pool floor. A horizontally elongated opening is defined along the bottom of the dividing wall. A quick opening and a quick-closing gate disposed within the opening communicates between the wave-producing portion and the pool area. In the embodiment chosen for illustration, a deflector traversing the width of the pool is spaced downstream of the gate at the junction of the horizontal floor and the pool floor. Hydraulic pumping means are provided to pump water from the pool area and deposit same at a raised elevation within the wave-producing portion.

It may be noted here that reference to a "pool" may also include natural bodies of water, such as rivers, streams or lakes where it is desired to produce appropriate waves for cooling effluent and oxygen enrichment. The wave-making process of the invention will operate to produce waves in such natural bodies of water but for optimum efficiency it may be desirable to install sidewalls in order to minimize any wave dissipation.

One embodiment of the invention involves a method for cooling bodies of water which comprises feeding and storing warm effluent water in a reservoir and periodically releasing the water from beneath the surface thereof into a pool area which contains water at a lower temperature. The released water is directed upwardly into the holding area causing an explosivelike wave which violently mixes air and water causing a maximum amount of oxygen to mix with the water and promote cooling thereof. This method eliminates the necessity for large cooling towers or a great number of holding areas and is more economical and permits more esthetic designs.

The invention relates to a method of creating waves of a type which substantially cools the wave and adjacent body of water by mixing with the air and at the same time entraining substantial amounts of air and water into the wave such that the oxygen content of the wave and adjacent body of water is enriched and the wave is cooled. The movement of the wave front downstream effectively displaces large amounts of air which enhances the overall cooling effect and sets up a natural draft over the pool surface.

This method provides a means for dissipating heat and as such can serve as a heat-sink in a conventional thermodynamic process such as refrigeration or steam power generation, or it may be used in any process in which water is used as the vehicle for heat removal and when it is convenient or desirable to make final heat rejection to atmospheric air. Water acting as the heat-transfer fluid, ultimately gives up heat to atmospheric air.

The rate or amount of heat removal depends on the temperature and moisture content of air. An indication of the moisture content of the air is its wet-bulb temperature. Ideally, the wet-bulb temperature is the lowest theoretical temperature to which the water can be cooled. Practically, the cold-water temperature approaches but does not equal the air wet-bulb temperature. The magnitude of approach to the wet-bulb temperature is dependent on the efficiency of air-to-water contact, time and amount of break-up by water into droplets.

A cooling of the warm effluent water in the reservoir to within 5°–24°F. and preferably 5° to 15°F. above wet-bulb temperature represents good practice. The cooling action of the wave generating apparatus varies with the exposed surface, the water temperature, the relative humidity and air temperature, the volume of water released, size and shape of wave, and linear velocity of wave over the surface of the water. The evaporative water cooling method of the present invention experiences a loss of water due to evaporation which is equal to about 0.5 to 2.0, and preferably, 0.5 to 1.0 percent of the water circulated depending principally on the temperature cooling range, ambient and wetbulb temperatures, cloud cover and wind conditions.

The heat transfer mechanism principally involves;
1. latent heat transfer owing to vaporization of a small portion of the water; and
2. sensible heat transfer owing to the differences in temperature of water and air.

Approximately 70–90 percent of the heat transfer is due to latent heat and 10–30 percent from sensible heat.

In another embodiment, the invention comprises a method for treating sewage effluent which has particular application in the field of waste treatment and water purification. Typically, a raw sewage effluent is 95 percent by weight liquid. A sewage effluent stream is fed and stored in a reservoir and periodically released from the lower portion of the reservoir into a settling area. The released water is directed upwardly toward the surface of the water in the settling area with an explosive action which breaks down organic materials into finer particles, mixes liquids, solids and chemicals instantly and dissolves large amounts of oxygen within the water.

The sewage is released from the reservoir at controlled intervals to produce series of explosive-type waves which effectively mix air and organic materials together with water to ensure complete aeration. The aeration of the sewage water by the wave action facilitates the consumption of organic waste by bacteria. The resultant wave is directed over a settling area where sedimentation of heavier material occurs. The upper surface of the water is continuously aerated by the wave action while the lower portion is agitated by means of a weir-like baffles arranged across the settling area to permit denser materials to settle in finer grades as the water moves over the full length of the channel. The settling area is designed so that the agitation effect produces complete digestion while the ebbing and flowing of the waves permits the settling of solids and minute particles. The activated sludge settles on a baffle-like floor and is pumped from the tank.

BRIEF DESCRIPTION OF THE DRAWINGS

The above and other objects and advantages of the present invention will be more clearly seen when viewed in conjunction with the accompanying drawings wherein:

The cooling embodiment will be described with reference to FIGS. 1 and 2 of the drawings. Turning now to the drawings, the same reference numerals indicate corresponding elements throughout the several views. FIG. 1 is a perspective view of a cooling apparatus and pool embodying the teachings of the present invention. The overall dimensions and volume of water will depend on the required cooling capacity. The feed to the unit will be described as a warm effluent from a steam electric generation plant which is fed into reservoir R. The apparatus comprises a pool area generally designated by the reference character A. A floor 10 forms the bottom of the pool area A. An end section 11 connects the sides 13 and 14. The bottom 10 may be horizontal or sloping upward in the direction away from the wave generating apparatus. The side walls 13 and 14 extend vertically upward from the floor 10 and extend the longitudinal length thereof. Heightened sidewall extensions 13a and 14a integral with the sidewalls 13 and 14, respectively, extend beyond the upstream end of the floor 10. An upwardly, outwardly sloping rear wall 17 extends laterally between the terminal ends of the sidewall extensions 13a and 14a. A forward wall 18 extending between the sidewalls and spaced from the rear wall 17 forms a mutual division between the pool area A and the waveproducing portion R. The only purpose of these walls 17 and 18 and sidewalls 13a and 14a is to provide means for storing or maintaining a head of water above the normal quiescent level of the body of water in the pool area A.

Referring now to FIG. 2, which further details a preferential construction of FIG. 1, a substantially horizontal floor 19, forming the bottom of the wave-producing portion R, extends forward of the wall 18 and terminates above the upstream end of floor 10. A deflector 20 extending between the sidewalls 13 and 14 slopes upward from the floor 19 to a rounded apex, then slopes downward blending into the pool floor 10 to form an integral junction between the aforementioned floors. The front surface of the deflector 20 rises upward toward the surface of the water, the apex is rounded, and the rear surface slopes downward. Preferably, the deflector should rise in a smooth curve from the floor 19 and continue into a rounded top surface, but the specific curvature may vary, depending on the various parameters to be discussed more thoroughly herein, such as for example, the location of the deflector. The vertical wall 18 terminates with a lower edge 22 approximately level with the rounded apex of the deflector 20 and spaced above the floor 19 to provide a water passageway communicating between the pool A and the reservoir R. A vertical gate 23 operable to provide fluid communication between the water in the reservoir and the water in the pool area supported by spaced columns along its length is disposed between the lower edge 22 of the wall 18 and the floor 19. This gates is preferably risable as is shown, but it could also be operated in whole or in part in a lateral direction. A double-acting plunger, here shown as fluid cylinder 27, provides means for rapid displacement of the gate between the open and closed positions. A fluid compressor 28 supported upon an apron 29 extending from the rear wall 17 communicates through the conduit 30, control junction 31 and fluid supply lines 32 and 32a to operatively control the fluid cylinder 27.

Figure 1:
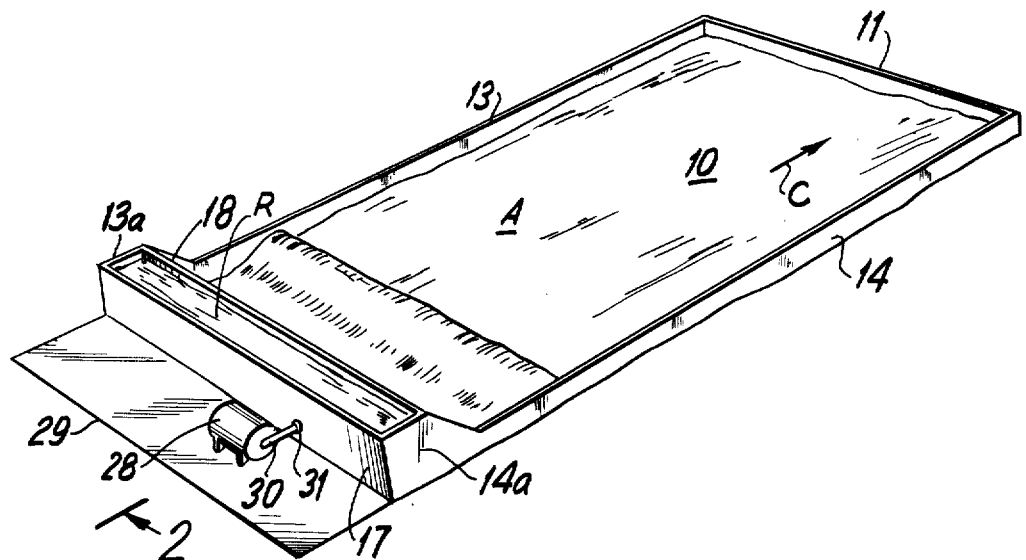
FIG. 1 is a perspective view of an apparatus for practicing the method of the present invention.

The rate of water removal from the pool area is adjusted to substantially equal the average rate of water release into the pool area. The conduits 33 for withdrawal of water from the pool are positioned remote from the wave-producing area and preferably are as near to the downstream area as is feasible in order to prevent the formation of echo or rebound waves which would interfere with the creation and operation of the desired waves.

Warm water is introduced into reservoir R through inlet 38 and released into the pool by raising gate 23 whereby the water is deflected against deflector 20 forming wave W. The wave passes down the length of the pool area A and is cooled. At points near the end of pool A the cooled water is removed through outlets 33 and may be recycled to reservoir R for further cooling or discharged into an adjoining river or stream. Alternatively, the cooled water may be returned to the power generation station and again used to indirectly cool steam.

Figure 2:
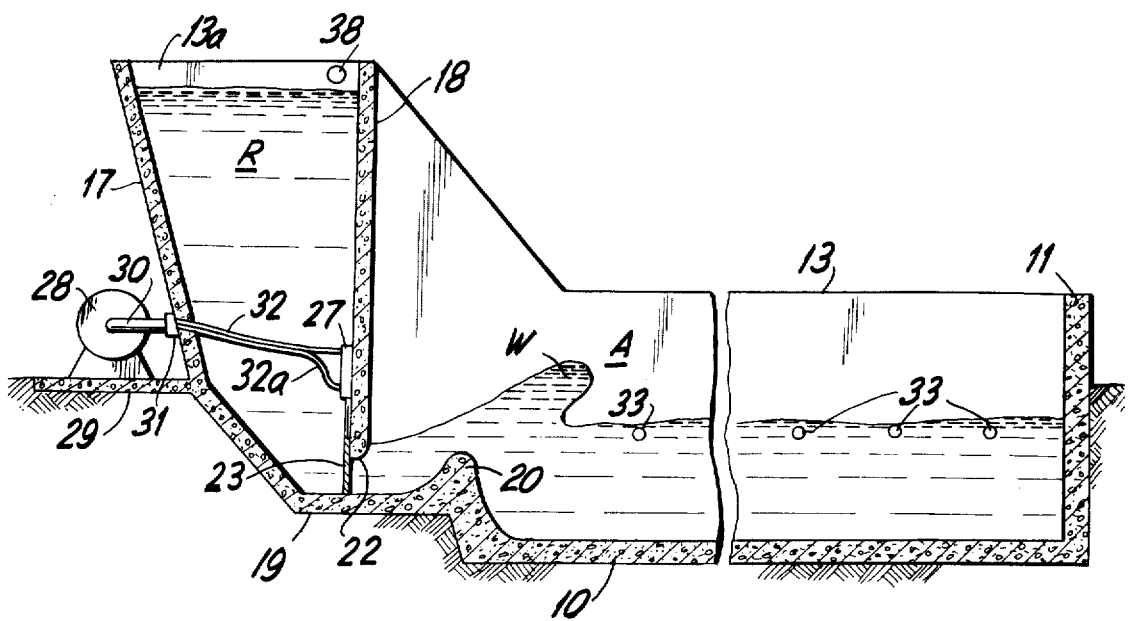
FIG. 2 is a cross-sectional view taken along the line 2—2 of FIG. 1 to illustrate the operation thereof.

In operation, the gate 23 is first lowered to form a substantial seal between the pool area A and the wave-producing portion R. The pool area A is first filled with water such that the quiescent level is above the conduits 33. The wave-producing reservoir R is filled with warm effluent water to its desired height. The hydraulic fluid cylinders 27 are activated, raising the gate 23. As the gate rises, the hydraulic head of the stored water within the wave-producing portion forces a quantity of water from the lower level thereof through the passageway between the wall 18 and the floor 19. As this quantity of water forceably strikes the deflector 20, a wave (illustrated as W in FIG. 2) is created which travels downstream within the pool area to wall 11. Water flows by gravity from the pool through the conduits 33 and suitable connecting lines and can be recycled if desired to inlet 38. It will be readily understood by those skilled in the art that the height of water and the size and duration of the opening of the gates 23 directly controls the quantity of water ejected from the wave-producing portion.

It has been determined that the formation of solitary waves of translation of the spilling breaker type to obtain maximum cooling and oxygen enrichment is dependent upon the following factors:

The pressure difference between the height of the water in the retained head of the reservoir and the height of water in the pool area;

The interval of time through which the pressure difference operates to discharge water from the reservoir and the amount of water flowing during that interval of time;

The amount of vertical rise of the front upward sloping face of the deflector with respect to the horizontal distance of the apex of the deflector from the point of release of water from the reservoir;

The relationship for a given shape of the front and rear surfaces of the deflector, between the height of water in the reservoir and the height of water in the lagoon area above the apex of the deflector.

The translatory wave that is produced is referred to as the plunger breaker type. In this type of wave, the waves curl over in breaking, enclosing an air pocket which explodes during the breaking process. The action accomplishes excellent mixing of air and water and in sewage treatment where solid particles are involved breaking and pulverizing of the particles.

With regard to these factors, it is clear that according to the present invention the pressure of water discharged from the reservoir is a function of the hydraulic head in the reservoir which varies proportionally with the height of the column of retained water.

The interval of time through which the pressure difference operates to discharge water and the amount of water flowing during that interval of time are related so that the longer the discharge means operates in the open position, the more water is discharged.

The size of the gate opening through which water will be discharged for a predetermined height and for a predetermined time is also equally important.

The amount of vertical rise of the front upward sloping face of the deflector with respect to the horizontal distance of the apex of the deflector from the point of release of the water from the reservoir are interrelated such that the vertical rise or height of the apex increases as the horizontal distance of the apex increases from the point of discharge.

Where the floor 10 is constructed so as to have an upward slope, the slope of the floor can be a factor in the formation of translatory waves. The frictional value of the material comprising the bottom may also effect the formation of the waves.

The amount of water in the reservoir with respect to the amount of water above the apex of the deflector is important in the practice of the method of the invention. The height of water in the reservoir should be increased as the height of water above the apex is increased.

In a particular instance, it is determined that a suitable wave may be generated by constructing a pool such that the normal quiescent level of water within the pool area is two to three feet above the apex of the deflector and the reservoir or wave-producing portion accommodates a water column extending twenty to thirty feet above the floor 19 and producing a hydraulic head of 15 to 25 feet. The deflector used herewith begins its inclination immediately in front of the gate to a height of 3 feet. Using the water column height and deflector combination as described above, a wave of approximately 4 to 6 feet high (reference character W of FIG. 2) is generated approximately 20 to 30 feet from the wall 18. Numerous wave formations may be created with minor variations of parameters, in accordance with the invention. For example a shorter water column and subsequently reduced hydraulic head would tend to produce a long rolling type of wave. Similarly, a considerably shortened higher wave could be attained if the hydraulic head were held substantially high and the inclination of the deflector was increased.

Apparatus is constructed for use in accordance with the method of the invention, wherein the height of the deflector at its apex is 3 feet, the distance from the gate 9 feet, the height of the water in the reservoir above the quiescent level of the water in the pool area is 17 feet. By opening the gate and releasing a large amount of water a solitary wave of translation of the spilling breaker type is created. The translatory wave that is produced is referred to as the plunger breaker type. In this type of wave, the waves curl over in breaking, enclosing an air pocket which explodes during the breaking process. The action accomplishes excellent mixing of air and water and in sewage treatment where solid particles are involved breaking and pulverizing of the particles.

In Table 1, data is tabulated which represent good operating variables for obtaining the explosive swell type waves. In each case, the height of the deflector at its apex is 3 feet and the distance of the deflector from the gate is 9 feet.

TABLE I

| Reservoir Depth | Water Depth Over Apex | Hydraulic Head* | Pool Depth |
|---|---|---|---|
| 25 | 2 | 20 | 8 |
| 19 | 3 | 13 | 9 |
| 21 | 3 | 15 | 9 |
| 23 | 3 | 17 | 9 |
| 25 | 3 | 19 | 9 |
| 27 | 3 | 21 | 9 |
| 29 | 3 | 23 | 9 |
| 22 | 4 | 15 | 10 |

*Height of water level in reservoir above level in pool.

From the foregoing discussion, it is clear that the present invention contemplates varying the parameters set forth herein so that one may produce translatory waves of the spilling breaker type. The apparatus used in accordance with the method is a hydraulic pressure type apparatus which is extremely simple in construction and provides very definite advantages with respect to overall cost and maintenance operations. The energy requirements consist of the pump energy required to pump the water to be treated into the reservoir and the mechanical energy necessary to open and close the discharge gates or means. The generation of translatory waves may be accurately controlled so that optimum mixing of water and air occurs. The amplitude of the wave generated is also variably controlled according to the selection of parameters discussed herewith.

On opening the gate the water flowing through the gate and impinging upon the deflector results in the movement of a large volume of water traveling downstream of the pool area. The movement of this body of water produces a translatory wave of the spilling breaker type which obtains maximum mixing of water and air and maximum cooling. Upon re-opening the gate for the production of the next wave, it is interesting to note that if the water added to the pool by the previous wave has not been substantially removed, the subsequent wave will be in deteriorated form and may not be of the spilling breaker type. Indeed, if the rate of water removal from the pool area does not approximate the rate of water addition subsequent waves deteriorate. Also, ideally the removal of water should be as far from the wave-producing area and as near to the end wall 11 as is feasible. However, water may be removed at any area or at various areas between the wave-producing area and the extreme downstream area.

The apparatus is operated to obtain the best cooling and oxygen enrichment possible and will vary to some extent with the use intended.

The method can be carried out to produce waves of 2-6 feet and preferably 4-6 feet in height of the explosive translatory type at intervals of ¼ to 3 minutes between waves. To obtain waves of this type, the gate is raised to an opened position at a rate of about 300-500 feet per second and slowly closed. The amount of water released is determined by the period of time the gate is in the open position. The opening and closing cycle of the gate is carried out in 5 to 20 seconds and preferably 5 to 15 seconds.

The degree of cooling will depend to a large extent on the temperature of the effluent and the ambient dry and wet bulb temperatures. Starting with water effluent temperatures, i.e., feed to unit, of about 100° to 200° F and preferably 100° to 140° F the water may effectively be cooled by 20–100°F and preferably 20–60° F to temperatures of 50° to 150° F and preferably 70° to 90° F at wet bulb temperatures of 40° to 90° F and preferably 50° to 60° F.

More preferably in a steam-electric power generation station in which the warm effluent water temperature is 100° to 120° F the water is cooled by 30° to 60° F at wet bulb temperatures of 50° to 60° F.

The waves can be generated at such a rate that their linear velocity down the pool can be at a rate of 300 to 500 feet per minute.

The waves for cooling purposes are preferably 5–6 feet in height and about ¼ to 1 minute apart.

The waves for sewage treatment are preferably 4–6 feet in height and ⅓ to ½ minutes apart.

The invention may be better understood by reference to the following examples.

EXAMPLE I

The process of the present invention will be described with reference to the apparatus illustrated in the figures of the drawings.

A warm effluent water stream from an atomic energy reactor steam electric power generation station at a temperature of 120°–140° F is treated in accordance with the present invention to cool it by 20°–50° F to a temperature of 65°–90° F. The ambient temperature is about 70°–95° F and the wet bulb temperature is about 50°–70° F. The cooled effluent can be recycled to the power station to again be used as cooling water to again condense steam.

A 1,000 MWe generator employing 70,000–90,000 gallons per minute of cooling water in the steam condensing section is used as illustrative. It is recognized that the sizing of the reservoir and pool area is dependent upon the cooling capacity required. The operating conditions of the wave generating apparatus are then adjusted to meet these requirements.

A typical installation includes a pool area about 400 feet long by 300 feet wide (about 2.5 acres) having an average depth of nine feet. The pool area is filled with about 5–6 million gallons of water. The reservoir is constructed to be about 160 feet long, 20 feet wide and 50 feet in height.

The reservoir R is filled to a height of about 25–30 feet with about 0.5 million gallons of water. On starting up the apparatus an ambient dry bulb temperature 85°–95° F and a wet bulb temperature of 55°–60° F are recorded at 4:00 P.M. The pool water temperature at equilibrium before warm effluent is added is about 80° to 90° F.

Daily operation of the unit for 12 (10:00 A.M. to 10:00 P.M.) hour periods (prior to addition of warm effluent water) at steady state (i.e., with recycle to the reservoir) brings the temperature of the water in the pool area to about 65° to 75° F. 75°

The cooling effect of the wave generating apparatus is shown in the data which is collected over a period of two weeks and which is presented below in Table II. The readings are taken at about 4 P.M.

TABLE II

| Date | Air Temperature | Wet Bulb Temperature | Pool Temperature |
|---|---|---|---|
| 2 | 92 | 58 | 67 |
| 3 | 88 | 57 | 66 |
| 7 | 74 | 55 | 68 |
| 8 | 76 | 56 | 71 |
| 9 | 82 | 56 | 70 |
| 10 | 87 | 60 | 71 |
| 13 | 90 | 61 | 75 |
| 14 | 96 | 62 | 74 |

The data obtained on 2, 3 and 10 show a pool area water temperature approach to within about 10° F of wet bulb temperature.

The unit is ready for commencement of cooling operations.

Warm effluent water from the power station at a temperature of 120°F is pumped into reservoir R through inlet 38 at a continuous rate of 70,000–90,000 gallons per minute to maintain a reservoir depth of about 29 feet, a hydraulic head of about 23 feet, a depth over the apex in the pool area of about 3 feet and a pool depth of 9 feet. Cool water at a temperature of 70°–90°F is continuously withdrawn at the end of the pool opposite the wave generating apparatus through outlets 33 at about the same rate as that of addition, i.e., 70,000 to 90,000 gallons per minute.

In this example, the underwater wave gates 23 are opened to suddenly release about 70,000 to 90,000 gallons of water in a single wave (slug). The complete opening and closing cycle of the gates takes about 9–10 seconds.

The sudden shock of releasing this large volume of water when deflected upward by deflector 20 creates a wave about 5 to 6 feet in height which forms about 20–40 feet from the gate and travels away from the reservoir to the end of the pool at an average linear velocity of about 350 to 450 feet per minute. This action produces an explosive rolling wave which travels along the surface the entire distance. The sudden shock of releasing the water from the reservoir creates in the pool a translatory wave which as it forms and travels the length of the pool breaks over traping air under it and effectively and totally mixing the warm wave water with cooler air. Mixing of the warm water and the cooler body of water takes place at the same time. Each wave takes about ½ to 1.0 minute to transverse the 400 ft. length of the pool.

The rate of opening and closing can be varied over a wide range. The operation in this instance is such that about one wave per minute is generated and about 70,000 to 90,000 gallons of water per minute are released from the reservoir.

Under the prescribed operating conditions, the warm effluent water after steady state conditions are reached is cooled from 120°F down to a temperature of 70°–90°F which is suitable for recycling to the power station or for disposal into a river or adjoining body of water.

The translatory wave produced is commonly referred to as the plunger breaker type. In this type of wave the waves curl over in breaking, enclosing an air pocket which explodes during the breaking process. This action accomplishes excellent simultaneous mixing of air and water so that maximum cooling effect is achieved.

In a normal day of operation about 1 to 2 million gallons of water per day are lost due to evaporation to the atmosphere.

The pool surface as the wave passes is turbulent which causes the surface to cool and the surrounding water to cool more quickly. Turbulent entrainment of the water from beneath the wave as well as from the front and back of the wave results in increased mixing and cooling of the warm water wave.

EXAMPLE II

In this example, raw sewage is treated to increase the oxygen content of the sewage, break up solid particles, mix sewage and air and to cool the sewage all of which enhance the biological attack on the sewage. The apparatus and method used are similar to that described in Example I and in FIGS. 1 and 2.

A raw sewage effluent coming directly from trunk lines and interceptor lines containing about 95 percent liquids and 5 percent solids at a temperature of 65°–75°F is treated in accordance with the method of this invention.

The treated sewage effluent can be fed into rivers or streams or further treated in accordance with conventional sewage treatment procedures.

A typical installation includes a pool area about 300 feet long by 150 feet wide having an average depth of six feet. The pool area when filled contains about 1.0 to 1.5 million gallons of water and/or sewage effluent. The reservoir is constructed to be about 150 feet long, 20 feet wide and 50 feet in height.

The bottom of the pool may contain baffled areas for the collection and removal of settled activated sludge.

It is recognized that the sizing of the reservoir and pool area is dependent upon the sewage treating capacity required. The operating conditions of the wave generating apparatus are then adjusted to meet these requirements.

Raw sewage effluent at a temperature of about 70°F and containing about 2 to 3 ppm dissolved oxygen is pumped into reservoir R through inlet 38 at a continuous rate of 60,000 to 90,000 gallons per minute to maintain a reservoir depth of about 25–30 feet, a hydraulic head of about 20 to 25 feet, a depth over the apex in the pool area of about 2–3 feet and a pool depth of about 6 feet. Treated sewage at a temperature of about 60°F and having a dissolved oxygen content of 8–12 ppm is continuously withdrawn at the end of the pool opposite the wave generating apparatus through outlets 33 at about the same rate as that of addition, i.e., 60.000 to 90,000 gallons per minute. Prior to the start-up of the process the pool is filled with water and reservoir is filled with water and/or untreated sewage effluent. The underwater wave gates 23 are then opened to release about 20,000 to 30,000 gallons of the sewage effluent in a single wave (slug). The complete opening and closing cycle of the gates takes about 6 to 8 seconds. When the gates are opened the sewage is forced through the gate openings into the channel entrance and deflected upward by deflector 20 creating a wave about 4–5 feet in height which forms 20 to 30 feet from the gates and travels the length of the pool at an average linear velocity of 300 to 400 feet per minute. the opening and closing cycles of the gates are operated to produce two to three waves per minute. The sewage as it comes through the gates is under extreme pressure and instant breakdown of the solids in the sewage is produced at the moment of release.

The sudden shock caused by releasing the sewage from the reservoir creates in the pool a translating wave which as it forms and travels the length of the pool breaks over traping air under it and effectively and totally mixing air with sewage. This action produces an explosive rolling wave which travels along the surface the entire length of the pool. Each wave takes about ½ to 1.0 minute to transverse the 300 foot length of the pool.

The explosive action of the wave systematically breaks down organic matter into finer particles, encases large amounts of air with liquids and solids, mixes liquids, solids and air instantly and in addition cools the water, all of which enhances the bateriological attack on the sewage. High levels of oxygen are dissolved throughout the surface of the pool to a depth of about 4 feet.

The rolling wave motion crushes, mixes and allows complete aeration of the broken down sewage particles. The minute sewage particles are surrounded by oxygen and due to the wave action are forced down below the surface to a depth of 3–4 feet to assume constant mixing and agitation during treatment. The aeration of the sewage facilitates the consumption of organic waste by bacteria.

The gates 23 are periodically opened and closed to form two to three waves every minute. The waves continuously flow down the length of the pool, allowing sedimentation of heavier objects and providing the carrying force for finer particles. The upper surface is continuously aerated while the volume of water and suspended sewage below is being agitated.

The activated sludge that forms settles on the bottom of the pool which can be made in the form of a series of baffles. The sludge can thus periodically be withdrawn by suitable means. The rate of opening and closing the gates can be varied over a wide range.

The depth of water in the pool can be adjusted to produce the wave and sediment settling action needed. The process can function as a batch operation with recycle of treated sewage until the desired degree of aeration is attained or sewage may be continually added through opening 38 while the aerated sewage is drawn off down stream through outlets 33 for further processing or disposal.

The continued wave-like motion over the holding area enhances the aeration and fosters the consumption of organic waste by bacteria. The waves may be adjusted to step up the process and the more oxygen that enters into the water, the faster the activation of sludge will take place. Thus, the subject process provides a highly effective treatment method at a low cost and in a minimum area.

EXAMPLE III

Figure 3:
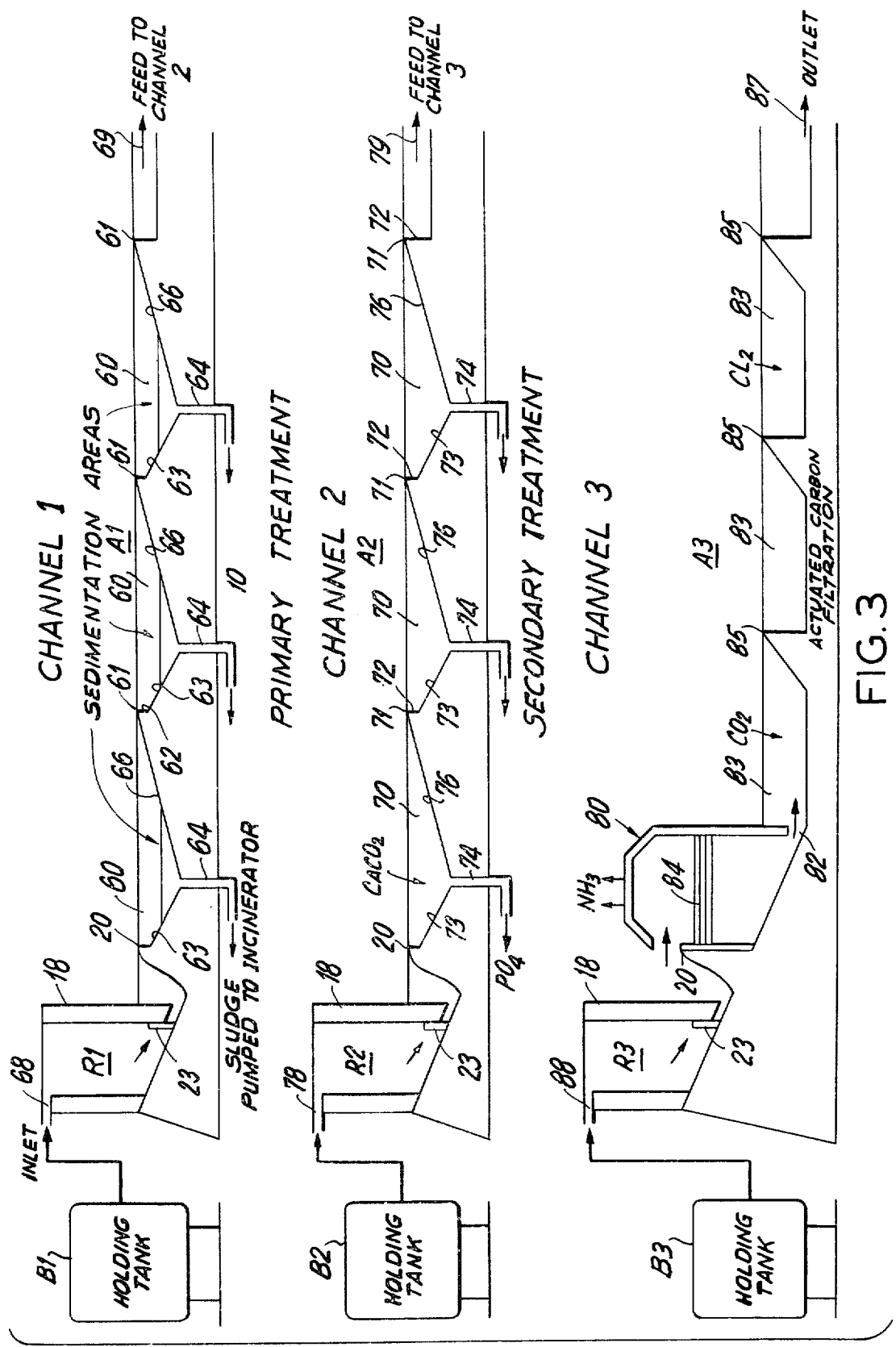
FIG. 3 is a schematic side view of a first, second and third channel.
Figure 4:
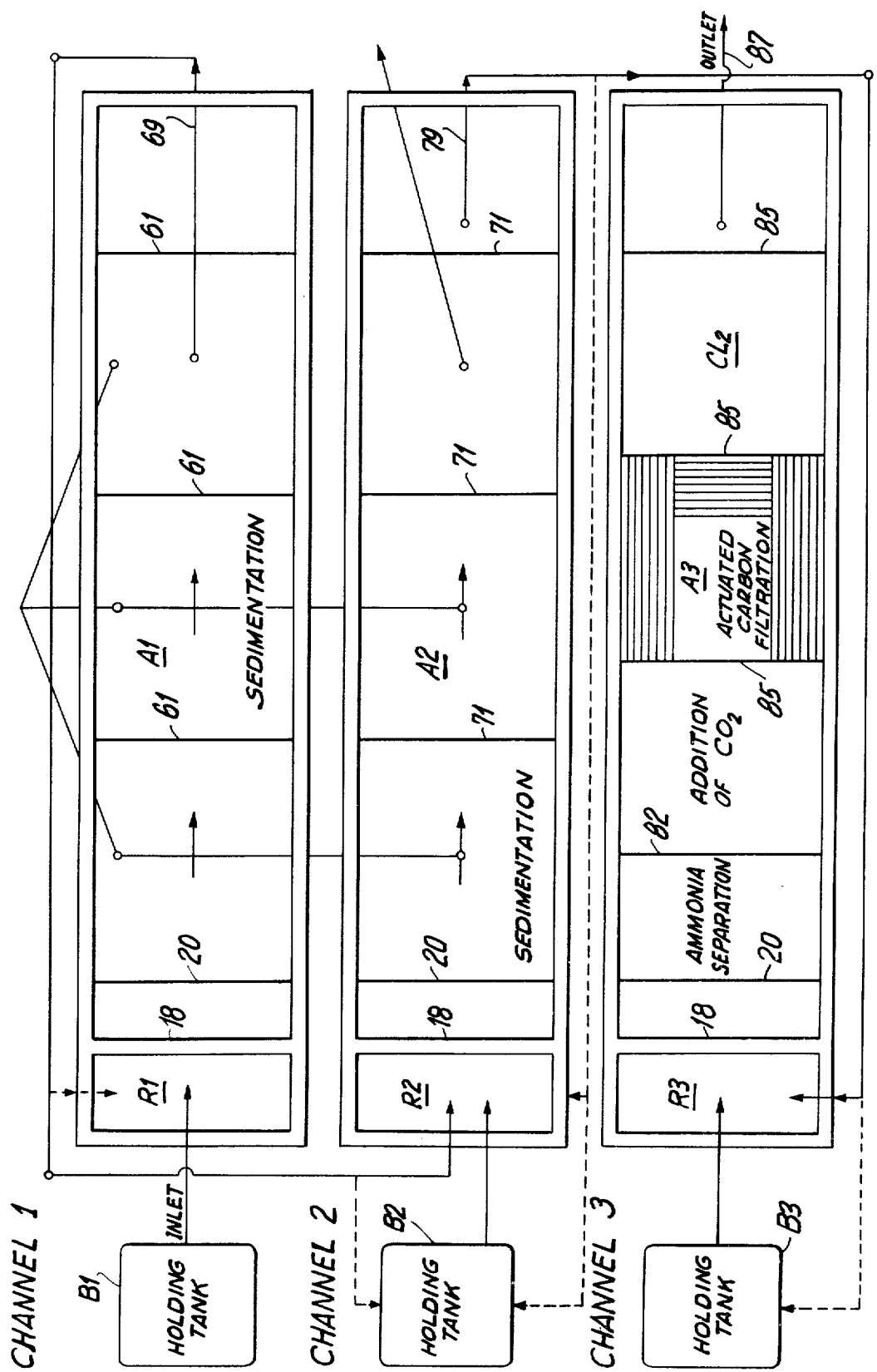
FIG. 4 is a top view of a simplified layout of a system for practicing the process of the invention showing the first, second and third channels of FIG. 3.

In FIGS. 3 and 4, a complete compact sewage treating system is described in schematic representation. The method is described as an ebb and flow waste stabilization system employing this new method to purify waste waters. Accordingly, the apparatus comprises three separate channels each including a holding tank, reservoir and gates which function as a continuous system. That is, raw sewage is fed through inlet 68 into channel No. 1. The partially treated sewage is withdrawn and fed into channel 2 where it is further treated, is withdrawn and fed to channel 3 where the treatment is completed and purified water is extracted downstream in channel No. 3 through line 87.

Channel No. 1 allows the settling of grit and solids. It allows also the removal of the remaining elements that have settled to the bottom during the overall aeration process. Channel No. 2 allows the application of lime or addition of other chemicals to reduce the concentration of phosphate within the mixture. Channel No. 3 allows for the addition of $CO_2$ and chlorine and the removal of ammonia that is formed by the bacteriological attack on the organic materials in the sewage effluent.

As an alternative, channels 1 and 2 can function as full holding areas and activated sludge can be periodically removed loading it directly onto vehicles or conveyors, or recirculation may also be required to continue the activation of sludge.

The overall operation of the wave generating apparatus in each of the three channels is essentially the same as described in Example II above.

In this embodiment of the invention, raw sewage comprised of 95 percent liquids and 5 percent solids is fed into a first holding tank behind the wave gate of the reservoir R of channel 1. The gates 23 are lifted causing a rapid surge of sewage which is deflected by deflector 20 and forms an explosive wave about four-five feet in height which passes over the holding area in channel 1. This explosive-type wave both dissolves and entraps large quantities of air in the water both initially and as the wave flows along channel 1. The explosive wave action also serves to break up the sewage into minute particles which may be more readily attacked by bacteria.

In the reservoir and immediately after release the entire sewage slurry is under an extreme pressure. Instant breakdown of solids in the sewage is produced at the moment of release from the reservoir. Minute particles of sewage are surrounded by oxygen and then forced back down into the mass within the channel.

In channel 1 the gates 23 are periodically activated to cause a series of waves which travel the length of the channel. The timing of the gates 23 are such that two to three waves are formed every minute. With the continued wave-like motion over the holding area in channel 1, the activated sludge that is formed settles, and aeration of the sewage is enhanced and fosters the consumption of organic waste by bacteria. The more oxygen that enters the water, the faster the activation of sludge will take place.

The design of the channel bottom allows the waves to continue across the entire surface. Also, allowing, during the ebb and flowing of the wave, sedimentation of the heavier particles. Increased turbulence is provided by the peaks 61 of the baffles as the waves pass over the baffle areas.

A series of baffle-like settling areas 60 are built into the floor of the channel 1 to facilitate sedimentation. The settling areas 60 comprise a plurality of transversely arranged troughs having a peak 61 at approximately the quiescent level of the water, a vertical wall 62 descending therefrom and a rapidly sloping surface 63 leading to an outlet 64. On the opposite side of the outlet 64, the surface 66 slopes more gradually upward to the next peak 61. While three settling areas 60 are shown, it is to be understood that any suitable number of settling areas could be selected depending upon the volume of materials treated. At the end of the last settling area 60, the treated sewage is withdrawn through line 69 and is fed to channel No. 2. Additional oxygen may optionally be introduced in the feed stream by forcing compressed air therein. In the meanwhile, the precipitated sludge from the outlets 64 may be pumped to an incinerator or to drying beds for disposal. Activated sludge may also be withdrawn and recycled if needed back into the holding tank B1 or the reservoir of channel 1 to enhance the bacteriological effects upon the new sewage feed.

The thus treated sewage effluent from channel 1 is next circulated to a second holding area B2 behind the wave gate of channel 2 for secondary treatment.

The reservoir and wave generating means in channel No. 2 function precisely like that of channel No. 1, and the sewage mass is once again mixed with air allowing the bacteria to break down the organic matter. The waves generated in channel 2 as in channel 1 travel the full length of channel 2.

The series of settling areas 70 of channel No. 2 function in a similar manner as areas 60 in channel No. 1 and are of the like design having sloping faces 73 and 76 directing sedimentary materials downwardly to outlets 74. The settling areas 70 comprise a plurality of transversely arranged troughs having a peak 71 at approximately the quiescent level of the water, a vertical wall 72 descending therefrom. Surfaces 73 and 76 are the same as 63 and 64 respectively of channel 1. Lime is added in the first holding area 70 to precipitate out any phosphates in the water. The phosphates settle in the holding areas 70 and are then pumped from the outlets 74 and disposed of.

The effluent 79 from channel No. 2, which may be as high as 90 percent pure water at this stage, is removed and transferred into holding tank B3 of channel No. 3. Additional air may be induced into the transfer line as needed to increase the oxygen content of the effluent. Optionally as desired part or all of the effluent from channel 2 line 79 can be recycled to channel 2 for additional treatment.

The reservoir and wave generating apparatus of channel 3 functions in essentially the same manner as that of channel Nos. 1 and 2. However, the design of channel 3 is such that the waves do not travel the entire length of the channel.

In channel No. 3, the wave gate again opens and the water in the form of a series of explosive waves surge over fill means 84, e.g., mechanical means for breaking up the water into smaller particles which filter downward to outlet 82. The breakup of water into smaller particles releases a small amount of ammonia gas into hooded area 80 and from there to the atmosphere.

Channel No. 3 is so designed that the holding tank B3 and the reservoir are at a higher elevation than channel area A3. This allows the sewage effluent to flow by gravity, after release, through the mechanical break-up means 84, for example strippings of hemlock, and inlet 82 into holding areas 83.

Further purification is accomplished by the addition of $CO_2$ gas in the first holding area 83 which precipitates nitrates. The effluent is then passed over activated carbon filters in the second holding area 83. Chlorine is added to the thus treated effluent in the third holding area 83. The addition of chlorine in the third holding area comprises the final purification step of the process. The purified water is carried over the last projection 85 to the outlet 87 and may then be pumped where desired. The water flowing from channel No. 3 in line 87 is substantially 100 percent pure.

Throughout this entire processing, a continual flow is set up. It is of course understood that one or more holding areas can be used for each of the above described purification steps. Raw sewage can be supplemented by additional water to set up a systematic timing of gate release producing waves along the surface at the desired cycle of frequency.

The present invention broadly relates to a process for treating water effluents to cool and to increase the oxygen content thereof. The process has specific application in the treatment of warm water effluents from electric power generation stations, industrial processes and in the treatment of sewage effluents.

In the treatment of warm water effluents, the dissolved oxygen content of the warm water effluent feed to the reservoir can be less than 3 ppm, for example, 0 to 3 ppm. The cooled water withdrawn from the downstream area can have a dissolved oxygen content of more than 5 ppm, e.g., 5 to 12 ppm.

The warm water effluent from a power generating station feed to the reservoir can have a dissolved oxygen content of 0 to 2 ppm. The cooled water withdrawn from the downstream area can contain 6 to 10 ppm dissolved oxygen. Depending on the operating conditions, the dissolved oxygen content can be 5 to 8 ppm.

In the treatment of sewage effluent feed to the reservoir, the feed can have a dissolved oxygen content of less than 4 ppm, e.g., 0 to 4 ppm. The dissolved oxygen content, due to the wave action, during the treatment of the sewage can be more than 4 ppm, e.g., about 4 to 12 ppm depending on the stage of treatment and the biological oxygen demand. The substantially pure water effluent from the sewage treating process can contain more than 8 ppm, e.g., about 8 to 14 ppm dissolved oxygen.

CONCLUSION

To summarize, the invention pertains to a process for treating water, although by variation of certain parameters it can be used to treat other liquids as well. The process introduces substantial amounts of oxygen within the liquid to be upgraded or cooled by the formation of waves therein. Screening and sedimentation may be included along with chemical action. The method may be used to wash industrial discharges or components. Further uses include separation of material on a weight per volume basis to permit automatic grading of substances. The wave action can be adjusted to produce a tumbling action for abrasive purposes.

In an application of current interest, the method can be adapted to cleaning harbors and to eliminate surface pollutants as in oil dumps, etc. The units would allow large water volumes to be processed and returned directly to where they originated.

It is to be understood that the above-described arrangements are merely illustrative of the application of the principles of the present invention. Numerous other arrangements may be readily devised by those skilled in the art which will embody the principles of the invention and fall within the spirit and scope thereof.

Various changes and modifications in the device chosen for purposes of illustration in the drawings will readily occur to persons skilled in the art having regard for the disclosure thereof.

Having described my invention, what I claim as new and desire to secure by letters Patent is:

1. The method of treating sewage to eliminate pollutants therefrom;

Comprising the steps of:
a. Feeding the sewage into a reservoir to a desired level to obtain a hydraulic head of 15 to 25 feet behind a wave gate outlet means which leads to a pool area having a beffle-like floor design, filling the pool area to a predetermined level of 6 to 8 feet in depth with water, said sewage or mixtures thereof with the outlets therefrom closed, said desired level being 20 to 25 feet above the normal quiescent level of the water, said sewage or mixtures thereof in said pool area;
b. Lifting the wave gate for a predetermined time interval of 5 to 20 seconds and at a predetermined rate of speed of 300 to 500 feet per second, said wave gate outlet being located at the lower portion of the gate to cause a sudden surge of sewage effluent under the influence of the hydraulic head;
c. Directing the water upwardly with a deflector to form a translatory wave of the spilling breaker type 4 to 5 feet in height which moves across the pool area, aerating the sewage by dissolving large quantities of air therein by the wave action and simultaneously breaking up particles to promote more effective aeration and removing activated sludge settling from the sewage, said activated sludge containing said pollutants.

2. The method of treating sewage in accordance with claim 1 including the step of agitating the sewage by means of a series of baffle-like projections to increase the amount of oxygen therein and to precipitate out the activated sludge.

3. The method of treating sewage in accordance with claim 2 wherein the sludge is precipitated out over a series of transversely arranged settling areas.

4. The method of treating sewage in accordance with claim 1 further including the steps of removing the activated sludge from the pool area by pumping it to disposal means, and recirculating the water from the downstream portion of the pool area to the reservoir.

5. The method of treating sewage in accordance with claim 1 further including the step of feeding the sewage effluent from the downstream portion of the pool area to further purification means.

6. The method of treating sewage effluent containing about 95 percent water and about 5 percent solids to eliminate pollutants therefrom; Comprising the steps of:
a. Periodically causing wave movements of predetermined characteristics in a first channel area having an upstream and downstream area and containing sewage to maximize the amount of oxygen dissolved therein and to break up particles of matter to smaller sizes, said waves being formed at the upstream area at the rate of 2 to 3 per minute and characterized as being translatory waves 4 to 5 feet in height of the spilling breaker type which curl over enclosing an air pocket that explodes during breaking to intermittently mix air and sewage effluent, precipitating out pollutants as sludge over a plurality of baffles arranged in the first channel area, removing the sludge from the system and feeding the downstream effluent from the first channel area to a second channel area;
b. Periodically causing wave movements of predetermined characteristics in the second channel area in substantially the same manner and having substantially the same characteristics as the waves in (a) to maximize the amount of oxygen dissolved therein and foster the consumption of organic matter by bacteria, adding lime to the channel area to cause precipitation of phosphates over a plurality of baffles arranged in the second channel area removing the precipitated material from the system and feeding the downstream effluent from the second channel area to a third channel area;
c. Periodically causing wave movements of predetermined characteristics in the third channel area in substantially the same manner and having substantially the same characteristics as the waves in (a), passing the waves over fill means which effectively break up the waves into smaller particles thereby removing and capturing ammonia from the effluent which continues to flow downstream, and chemically treating the effluent in the third channel area to produce purified water.

7. The method of treating sewage in accordance with claim 6 further including the steps of aerating the effluent as it is fed from the first channel area to the second channel area and from the second channel area to the third channel area by injecting compressed air into the stream.

8. The method of treating sewage in accordance with claim 6 wherein the water is chemically treated in the third channel area by the addition of carbon dioxide and chlorine thereto as the treated sewage effluent passes along the length of said channel area.

9. The method of treating sewage in accordance with claim 6 wherein the fill means consists essentially of strippings of hemlock.

10. The method of treating sewage in accordance with claim 6 wherein the baffles in the first and second channel areas comprise a plurality of transversely arranged troughs having a peak at approximately the quiescent level of the sewage in the channel areas and downwardly sloping walls of a particular configuration leading to an outlet for the sludge.

11. The method of treating sewage in accordance with claim 10 wherein the baffles each include in the direction of water movement a peak, a vertical wall and a rapidly sloping wall down to the outlet and an opposite wall sloping upwardly and more gradually to the next peak.

12. The method of treating sewage in accordance with claim 6 wherein the baffles in each of said first and second channel areas are weir-like in manner arranged across each of said channel areas to permit denser materials to settle in finer grades as the effluent flows over the full length of each of said channel areas.

13. A method for increasing the oxygen concentration of a sewage effluent stream to enhance the biological attack of microorganisms on the biodegradable sewage by mixing said sewage effluent with air and a body of water, said body having an upstream and downstream area and at the upstream area, producing translatory waves of the spilling breaker type which curl over enclosing an air pocket which explodes during breaking to intermittently mix sewage air and water;

Comprising the steps of:

a. Feeding and storing the sewage effluent containing about 95 percent water and about 5 percent solids in a reservoir at a predetermined level of 20 to 25 feet above the normal quiescent level of the water in said body of water to provide a hydraulic head of stored sewage effluent of 15 to 25 feet, said reservoir being separate from said body of water and comprising discharge means for releasing a controllable amount of said stored sewage effluent water from the reservoir to said body of water;

b. Successively opening and closing said discharge means at a rate of two to three times per minute for intermittent release of a controllable amount of said stored sewage effluent under the pressure of said hydraulic head, into said body of water, from beneath the surface of said body of water, said body of water in the area of wave generation being 6–8 feet in depth;

c. Directing each controllable amount of said released sewage effluent against a deflector so that the released water flows diagonally upward toward the surface of said body of water to form a translatory wave of the spilling breaker type 4 to 5 feet in height and a movement of water in the downstream direction, said water flowing at a linear velocity over said bottom surface at a rate of 300 to 400 feet per minute and withdrawing treated sewage from the body of water substantially enriched in oxygen concentration.

14. The method of claim 13 wherein the sewage effluent feed to the reservoir contains 0 to 4 ppm dissolved oxygen and the dissolved oxygen content due to the wave action during treatment is about 4 to 12 ppm.

15. The method of claim 14 wherein the effluent from the sewage treatment process contains about 8 to 14 ppm dissolved oxygen.

* * * * *